US011363205B2

United States Patent
Sakurai

(10) Patent No.: US 11,363,205 B2
(45) Date of Patent: Jun. 14, 2022

(54) IMAGING APPARATUS AND IMAGING SYSTEM

(71) Applicant: Panasonic Intellectual Property Management Co., Ltd., Osaka (JP)

(72) Inventor: Mikio Sakurai, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/221,141

(22) Filed: Apr. 2, 2021

(65) Prior Publication Data

US 2021/0314491 A1 Oct. 7, 2021

(30) Foreign Application Priority Data

Apr. 6, 2020 (JP) .............................. JP2020-068499

(51) Int. Cl.
*H04N 5/232* (2006.01)
*H04N 5/225* (2006.01)

(52) U.S. Cl.
CPC ....... *H04N 5/23287* (2013.01); *H04N 5/2253* (2013.01)

(58) Field of Classification Search
CPC .. H04N 5/23287; H04N 5/2253; H04N 5/232; H04N 5/2328; H04N 2201/0428; H04N 2201/333; H04N 1/327; H04N 1/32614; H04N 1/3278; H04N 1/32789; H04N 1/32791; H04N 1/33392; G03B 2205/0007; G02B 27/646
USPC ...................................................... 348/208.7
See application file for complete search history.

(56) References Cited

U.S. PATENT DOCUMENTS

| 8,212,880 B2* | 7/2012 | Anderson ............ H04N 5/2252 348/208.7 |
| 9,819,868 B2* | 11/2017 | von Borcke-Morawitz ................ H04N 5/2328 |
| 9,930,259 B2 | 3/2018 | Koyano |
| 10,425,584 B2 | 9/2019 | Ikeda |
| 10,848,675 B2 | 11/2020 | Watanabe |
| 11,070,718 B2* | 7/2021 | Barton ................ H04N 5/23258 |
| 2009/0160951 A1* | 6/2009 | Anderson .......... H04N 5/23258 348/208.4 |

(Continued)

FOREIGN PATENT DOCUMENTS

JP  H11-183951 A  7/1999
JP  2000-066258 A  3/2000

(Continued)

OTHER PUBLICATIONS

Office Action dated Jun. 23, 2020 which was issued in Japanese patent application No. 2020-068499 with its machine translation.

*Primary Examiner* — Pritham D Prabhakher
(74) *Attorney, Agent, or Firm* — Renner, Otto, Boisselle & Sklar, LLP

(57) ABSTRACT

An imaging apparatus mountable on an external device, the imaging apparatus includes: an image sensor that captures a subject image formed through an optical system to generate image data; an image stabilizer that performs image stabilization on an image indicated by the image data; and a controller that detects a vibration caused by a resonance frequency of the external device, wherein based on a detection result, the controller controls the image stabilizer to remove, from a target of the image stabilization, the vibration caused by the resonance frequency.

15 Claims, 11 Drawing Sheets

(56) References Cited

U.S. PATENT DOCUMENTS

| | | | | |
|---|---|---|---|---|
| 2011/0221900 A1* | 9/2011 | Reich | ............... | G03B 15/006 |
| | | | | 348/148 |
| 2012/0026351 A1* | 2/2012 | Yamamoto | ............... | G03B 5/00 |
| | | | | 348/208.7 |
| 2012/0212633 A1* | 8/2012 | Anderson | ............ | H04N 5/2252 |
| | | | | 348/208.4 |
| 2015/0071627 A1* | 3/2015 | Hoang | ............... | F16M 11/10 |
| | | | | 396/421 |
| 2017/0037995 A1* | 2/2017 | Pan | ............... | F16M 11/12 |
| 2017/0150053 A1* | 5/2017 | Eline | ............... | H04N 5/23258 |
| 2018/0031074 A1* | 2/2018 | Aoki | ............... | F16F 15/002 |
| 2018/0302548 A1* | 10/2018 | Bao | ............... | G06V 20/13 |
| 2019/0018214 A1* | 1/2019 | Liao | ............... | G02B 7/021 |
| 2019/0387161 A1* | 12/2019 | Barton | ............... | H04N 17/002 |
| 2020/0084358 A1 | 3/2020 | Nadamoto | | |
| 2020/0137310 A1* | 4/2020 | Zhang | ............... | B64C 39/02 |

FOREIGN PATENT DOCUMENTS

| | | |
|---|---|---|
| JP | 2001-358982 A | 12/2001 |
| JP | 2017-021253 A | 1/2017 |
| JP | 2017-134190 A | 8/2017 |
| JP | 2017-152995 A | 8/2017 |
| JP | 2019-125890 A | 7/2019 |
| JP | 2020-042078 A | 3/2020 |

\* cited by examiner

IMAGING APPARATUS AND IMAGING SYSTEM

BACKGROUND

1. Technical Field

The present disclosure relates to an imaging apparatus having an image stabilizing function and an imaging system including the imaging apparatus.

2. Related Art

JP 2019-125890 A discloses an imaging apparatus that calculates a correction amount for driving each image stabilizer by using an interchangeable lens and an angular velocity sensor provided in a camera body. In the imaging apparatus, the interchangeable lens transmits to the camera body a first correction amount calculated on the basis of the shake of the imaging apparatus. The camera body acquires a correction error of a second image stabilizer in the camera body on the basis of a communication delay of the first correction amount. The camera body then performs an electronic image stabilization (by image processing) using the electronic image stabilizer on the basis of the correction error. This achieves the object of reducing the correction error caused by the communication delay of the first correction amount in the camera body that corrects the image shake by using the first correction amount received from the interchangeable lens.

SUMMARY

The present disclosure provides an imaging apparatus and an imaging system capable of suppressing an erroneous operation in image stabilization due to external device of the imaging apparatus.

In one aspect of the present disclosure, there is provided an imaging apparatus mountable on an external device. The imaging apparatus includes: an image sensor that captures a subject image formed through an optical system to generate image data; an image stabilizer that performs image stabilization on an image indicated by the image data; and a controller that detects a vibration caused by a resonance frequency of the external device, wherein based on a detection result, the controller controls the image stabilizer to remove, from a target of the image stabilization, the vibration caused by the resonance frequency.

An imaging system according to one aspect of the present disclosure includes the imaging apparatus and an external device on which the imaging apparatus is mountable.

According to the imaging apparatus and the imaging system of the present disclosure, it is possible to suppress an erroneous operation in image stabilization due to the external device of the imaging apparatus.

DETAILED DESCRIPTION

Hereinafter, embodiments of the present disclosure will be described with reference to the relevant drawings. However, in the detailed description, unnecessary portions of the description relating to the prior art and the substantially identical configuration may be omitted. This is to simplify the description. In addition, the following description and the accompanying drawings are disclosed so as to enable those skilled in the art to fully understand the present disclosure and are not intended to limit the subject matter of the claims.

First Embodiment

In a first embodiment, an example of an imaging system that includes a digital camera as an example of an imaging apparatus and a gimbal device as an example of an external device will be described.

1. Configuration

Figure 1:
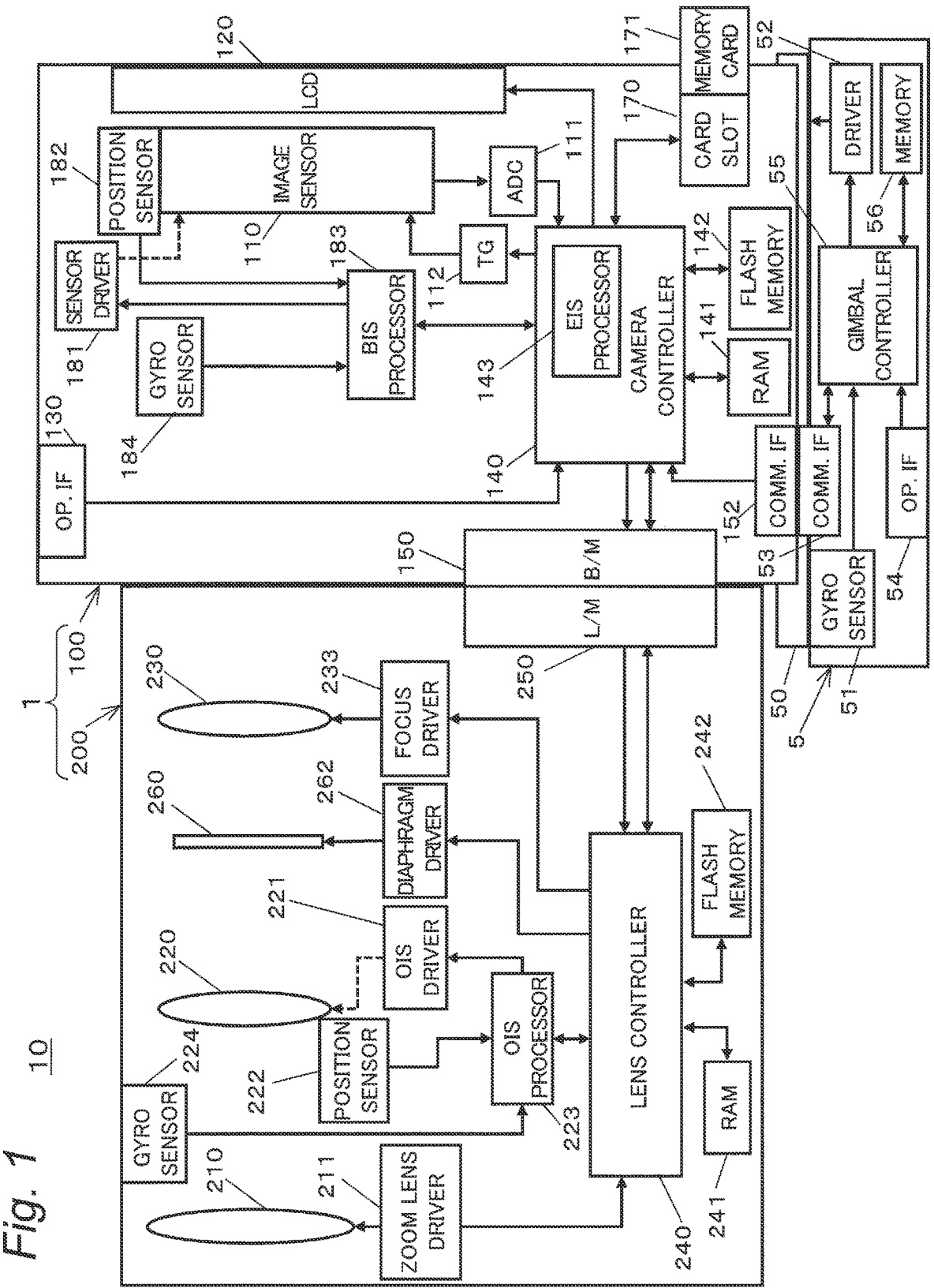
FIG. 1 is a block diagram showing a configuration of an imaging system according to a first embodiment of the present disclosure.
Figure 2:
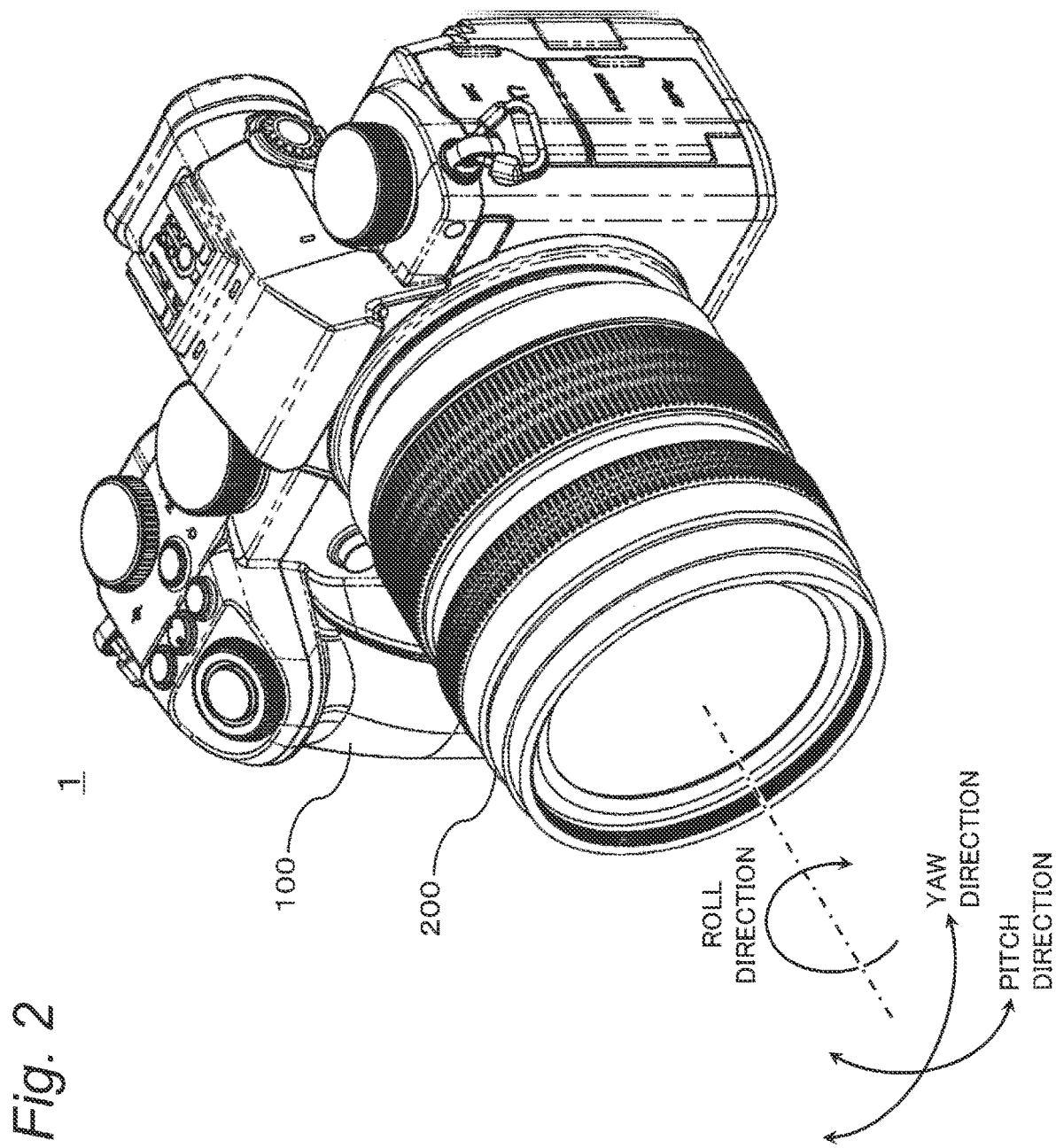
FIG. 2 is a perspective view of a digital camera according to the first embodiment.

FIG. 1 is a block diagram showing a configuration of an imaging system 10 according to the first embodiment. The imaging system 10 according to the present embodiment includes a digital camera 1 and a gimbal device 5. FIG. 2 is a perspective view of the digital camera 1 according to the first embodiment. The digital camera 1 includes a camera body 100 and an interchangeable lens 200 attachable to and detachable from the camera body 100. The gimbal device 5 is a device for achieving a camera shake correcting (i.e., image stabilizing) function by controlling the posture of the digital camera 1.

In the following description, a function of moving a correction lens in the interchangeable lens 200 to correct a shake will be referred to as an "optical image stabilizing (OIS) function". A function of moving an image sensor in the camera body 100 to correct the shake will be referred to as an "in-body image stabilizing (IBIS) function". A function of correcting a shake by adjusting an area, in which image data captured by an image sensor is cropped, will be referred to as an "electronic mage stabilizing (EIS) function".

In the following description, the direction of a rotation of the image sensor in the digital camera 1 corresponding to the horizontal direction and the vertical direction will be referred to as a yaw direction and a pitch direction, respectively, and the direction of a rotation by the rotation axis of the digital camera 1 along an optical axis will be referred to as a roll direction (see FIG. 2).

1-1. Camera Body

The camera body 100 (an example of an imaging apparatus) includes an image sensor 110, a liquid crystal monitor 120, an operation interface 130, a camera controller 140, a body mount 150, and a card slot 170. For example, the camera body 100 includes an EIS processor 143 implementing the EIS function as a functional configuration of the camera controller 140. The digital camera 1 of the present embodiment includes a communication interface 152 that performs data communication with the gimbal device 5 in the camera body 100, for example.

The camera controller 140 controls the entire operation of the digital camera 1 by controlling constituents, such as the image sensor 110, in response to an instruction from a release button. The camera controller 140 transmits a vertical synchronization signal to a timing generator 112. In parallel with this, the camera controller 140 generates an exposure synchronization signal. The camera controller 140 periodically transmits the generated exposure synchronization signal to a lens controller 240 through the body mount 150 and a lens mount 250. The camera controller 140 uses a dynamic random-access memory (DRAM) 141 as a work memory for control operations and image processing operations.

The image sensor 110 is an example of an image sensor that generates image data by capturing a subject image incident through the interchangeable lens 200. For example, the image sensor 110 is a charge-coupled device (CCD), a complementary metal-oxide-semiconductor (CMOS) image sensor, or an N-type metal-oxide-semiconductor (NMOS) image sensor. The generated mage data is digitized by an analog-to-digital (AD) converter 111. The digitized image data is subjected to predetermined image processing by the camera controller 140. For example, the predetermined image processing is gamma correction processing, white balance correction processing, scratch correction processing, YC conversion processing, electronic zoom processing, and JPEG compression processing.

The image sensor 110 operates at a timing controlled by the timing generator 112. The image sensor generates a still image, a moving image, or a through image for recording. The through image is mainly a moving image and is displayed on the liquid crystal monitor 120 so that a user determines a composition for capturing the still image.

The liquid crystal monitor 120 displays an image such as a through image and various information such as a menu screen. The liquid crystal monitor 120 is an example of a display in the present embodiment. Other types of display devices, such as an organic light-emitting (EL) display device, may be used in place of the liquid crystal monitor.

The operation interface 130 includes various operation members, such as a release button for instructing the start of image shooting, a mode dial for setting an image shooting mode, and a power switch. The operation interface 130 also includes a touch panel disposed overlapping the liquid crystal monitor 120.

The card slot 170 can be inserted with the memory card 171 and controls the memory card 171 on the basis of the control from the camera controller 140. The digital camera 1 can store image data into the memory card 171 and read image data from the memory card 171.

The body mount 150 is mechanically and electrically connectable to the lens mount 250 of the interchangeable lens 200. The body mount 150 is capable of transmitting and receiving data to and from the interchangeable lens 200 through the lens mount 250. The body mount 150 transmits an exposure synchronization signal received from the camera controller 140 to the lens controller 240 through the lens mount 250. The body mount transmits other control signals received from the camera controller 140 to the lens controller 240 through the lens mount 250. The body mount 150 transmits a signal received from the lens controller 240 to the camera controller 140 through the lens mount 250.

The camera body 100 further includes, as a configuration for achieving the IBIS function, a gyro sensor 184 (shake detector) for detecting the shake of the camera body 100, and an IBIS processor 183 for controlling shake correction processing on the basis of the detection result of the gyro sensor 184. The camera body 100 further includes a sensor driver 181 for moving the image sensor 110, and a position sensor 182 for detecting the position of the image sensor 110.

The sensor driver 181 can be produced with a magnet and a flat plate coil, for example. The sensor driver 181 may include others such as a motor or an actuator. The position sensor 182 is a sensor for detecting the position of the image sensor 110 in a plane perpendicular to the optical axis of the optical system. The position sensor 182 can be produced with a magnet and a Hall element, for example.

The IBIS processor 183 controls the sensor driver 181, on the basis of a signal from the gyro sensor 184 and a signal from the position sensor 182, to shift the image sensor 110 into the plane perpendicular to the optical axis so that the shake of the camera body 100 is canceled out. The range in which the image sensor 110 can be driven by the sensor driver 181 is limited mechanistically. The range in which the image sensor 110 can be driven by the sensor driver 181 for the IBIS function will be referred to as a "sensor movable range".

1-2. Interchangeable Lens

The interchangeable lens 200 includes an optical system, a lens controller 240, and a lens mount 250. The optical system includes a zoom lens 210, an optical image stabilizer (OIS) lens 220, a focus lens 230, and a diaphragm 260.

The zoom lens 210 is a lens for changing magnification of a subject image formed by the optical system. One or more lenses are included in the zoom lens 210. The zoom lens 210 is driven by a zoom driver 211. The zoom driver 211 includes a zoom ring operable by the user. Alternatively, the zoom driver 211 may include a zoom lever and an actuator or a motor. The zoom driver 211 moves the zoom lens 210 along the optical-axis direction of the optical system in response to an operation by the user.

The focus lens 230 is a lens for changing a focus state of a subject image formed on the image sensor 110 in an optical system. One or more lenses are included in the focus lens 230. The focus lens 230 is driven by a focus driver 233.

The focus driver 233 includes an actuator or a motor and moves the focus lens 230 along the optical axis of the optical system on the basis of the control of the lens controller 240. The focus driver 233 can be produced with a direct-current (DC motor, a stepping motor, a servo motor, an ultrasonic motor, or the like.

The OIS lens 220 is a lens for correcting a shake of a subject image formed by the optical system of the interchangeable lens 200 in the OIS function. The OIS lens 220 moves in a direction to cancel out the shake of the digital camera 1 for reducing the shake of the subject image on the image sensor 110. One or more lenses are included in the OIS lens 220. The OIS lens 220 is driven by an OIS driver 221.

By receiving the control of an OIS processor 223, the OIS driver 221 shifts the OIS lens 220 in the plane perpendicular to the optical axis of the optical system. The range in which the OIS lens 220 can be driven by the OIS driver 221 is limited mechanistically. The range in which the OIS lens 220 can be driven by the OIS driver 221 will referred to as a "lens movable range". The OIS driver 221 can be produced with a magnet and a flat plate coil, for example. A position sensor 222 is a sensor for detecting the position of the OIS lens 220 in the plane perpendicular to the optical axis of the optical system. The position sensor 222 can be produced with a magnet and a Hall element, for example. The OIS processor 223 controls the OIS driver 221 on the basis of an output of the position sensor 222 and an output of a gyro sensor 224 (shake detector).

The diaphragm 260 adjusts the amount of light incident on the image sensor 110. A diaphragm driver 262 drives the diaphragm 260 to control the size of its aperture. The diaphragm driver 262 includes a motor or an actuator.

The gyro sensor 184 or 224 detects a shake (vibration) in the yaw direction, the pitch direction, and the roll direction on the basis of an angular change per unit time, that is, an angular velocity, of the digital camera 1. The gyro sensor 184 or 224 outputs an angular velocity signal indicating the detected amount of shake (angular velocity) to the IBIS processor 183 or the OIS processor 223. The angular velocity signal output by the gyro sensor 184 or 224 may include a wide range of frequency components caused by camera shake, mechanical noise, and the like. Other sensors capable of detecting the shake of the digital camera 1 may be used in place of the gyro sensor. The gyro sensor 224 of the interchangeable lens 200 may not detect a shake in the roll direction. The gyro sensors 184, 224 may be sensors capable of individually detecting a shake in each direction.

The camera controller 140 and the lens controller 240 may each be formed of a hard-wired electronic circuit or a microcomputer using a program. For example, the camera controller 140 and the lens controller 240 may be produced with various processors, such as a central processing unit (CPU), a microprocessor (MPU), a graphics processing unit (GPU), a digital signal processor (DSP), a field-programmable gate array (FPGA), or an application specific integrated circuit (ASIC).

1-3. Gimbal Device

The gimbal device 5 is a device for rotatably supporting the digital camera 1. As shown in FIG. 1, the gimbal device 5 includes a camera supporting member 50, gyro sensor 51, a driver 52, a communication interface 53, an operation interface 54, a gimbal controller 55, and a memory 56, for example. The gimbal device 5 also includes a grip (not shown) for a user to grasp, for example.

The camera supporting member 50 includes a mounting base on which the digital camera 1 is detachably mounted. The camera supporting member 50 is has a mechanism in which the mounted digital camera 1 is rotatably supported on three axes in the pitch, yaw, and roll directions, for example.

The gyro sensor 51 is an example of a shake detector that detects the shake of the digital camera 1 from the gimbal device 5 in the imaging system 10. The gyro sensor 51 is provided in a portion that can detect a shake in the gimbal device 5. The gyro sensor 51 of the gimbal device 5 is configured in the same manner as the gyro sensor 184 of the camera body 100, for example. The gyro sensor 51 detects angular velocities in the pitch, yaw, and roll directions, for example.

In the gimbal device 5, the driver 52 drives a portion of the camera supporting member 50 in the pitch, yaw, and roll directions so as to control the direction of the mounted digital camera 1, for example. The driver 52 includes a motor or an actuator for rotation drive in the three axial directions, for example. The range in which the driver 52 can perform rotation drive, that is, the range in which camera shake correction (i.e., image stabilization) can be performed, is mechanistically limited by the camera supporting member 50, for example. The angle range in which a camera shake can be corrected by the gimbal device 5 will be referred to as a "gimbal correction angle". The driver 52 and the gimbal controller 55 are each an example of an image stabilizer in the gimbal device 5.

The communication interface 53 is a circuit for communicatively connecting the digital camera 1 to the gimbal device 5. The communication interface 53 receives and transmits various information from and to the communication interface 152 of the digital camera 1, in accordance with a predetermined communication standard. The communication interface 53 is an example of a setting interface in the present embodiment for setting information received from the digital camera 1, in the gimbal device 5.

The operation interface 54 includes an operation member such as a switch and a button provided on the exterior of the gimbal device for example. In response to reception of operation by the user, the operation interface 54 transmits a signal corresponding to the user operation to the gimbal controller 55. For example, the operation interface 54 receives a user operation of inputting various information. The operation interface 54 is an example of a setting interface for setting information, input by the user operation, in the gimbal device 5 in the present embodiment.

The gimbal controller 55 includes a CPU or the like, to control the operation of the entire gimbal device 5, for example. The gimbal controller 55 reads data and programs stored in the memory 56, performs various arithmetic processing, and achieves various functions. For example, the gimbal controller 55 controls the function of the image stabilizing operation in the gimbal device 5. The gimbal controller 55 is not limited to the above but can be produced with various processors as in the camera controller 140 and the lens controller 240.

The memory 56 is a recording medium for storing data, programs, and the like needed for achieving the function of the gimbal controller 55 and includes a flash memory, for example. The memory 56 may include random-access memory (RAM) and function as a work area for the gimbal controller 55 with storing data temporarily.

The configuration of the gimbal device 5 as described above is an example and is not particularly limited thereto. For example, the gimbal device 5 may further include a position sensor (not shown) for detecting a position of a portion driven by the driver 52. The gimbal controller 55 may perform the image stabilizing operation by proportional-integral-differential (PID) control by using the detection result of the position sensor.

1-4. Configuration of Image Stabilizing Function

Figure 3:
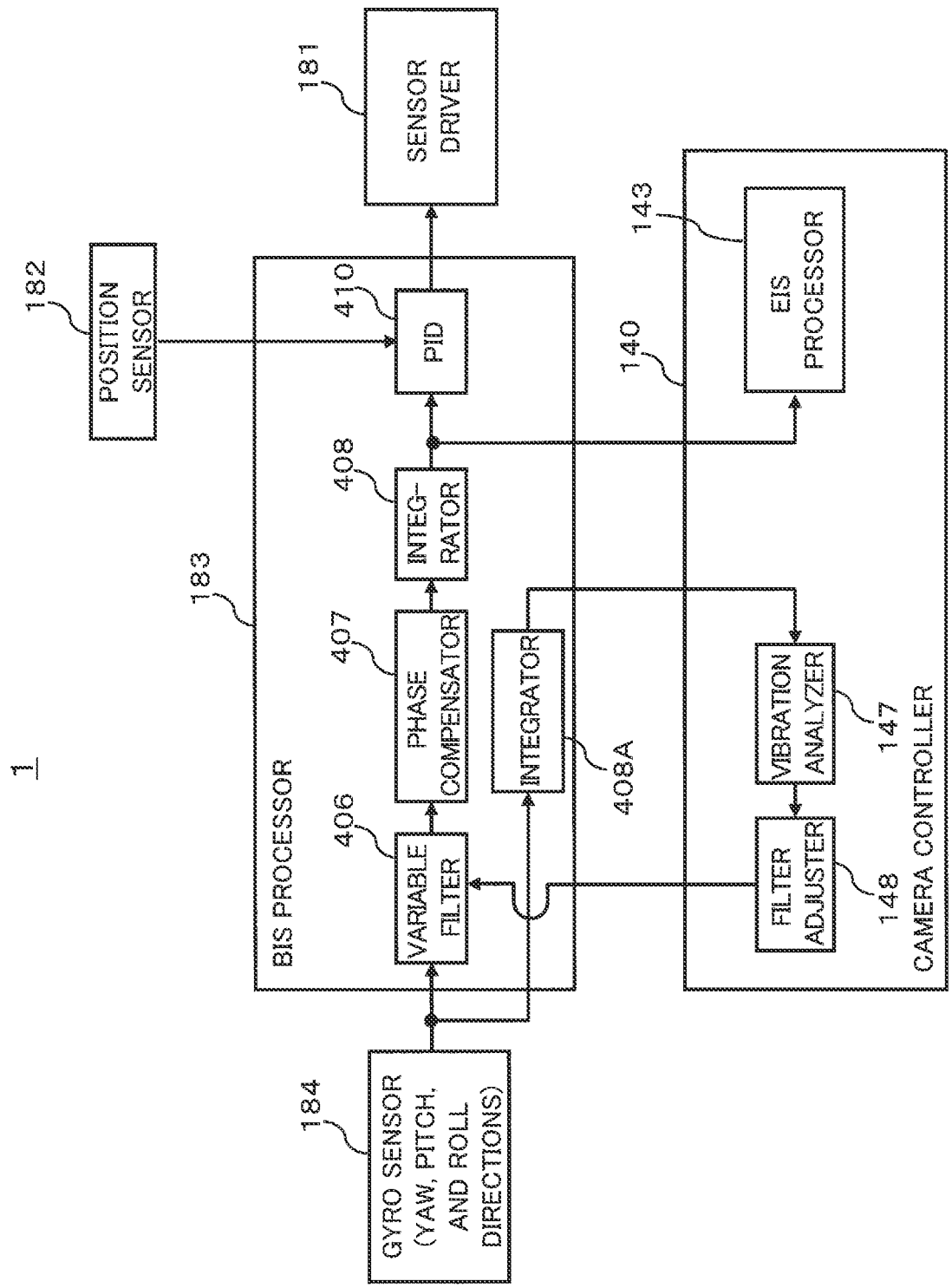
FIG. 3 is a block diagram showing a configuration of an in-body image stabilizer (IBIS) processor in a digital camera according to the first embodiment.
Figure 4:
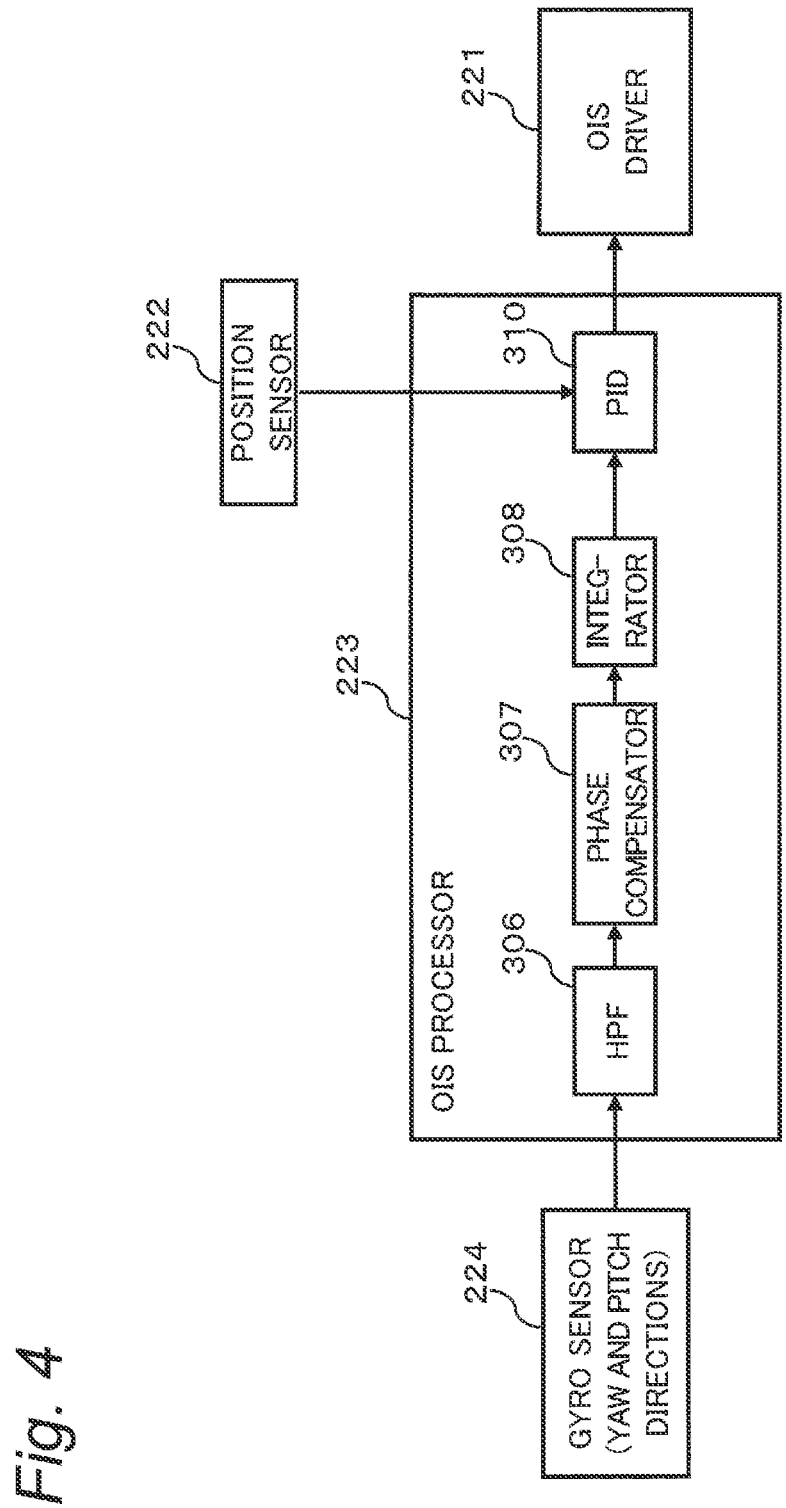
FIG. 4 is a block diagram showing a configuration of an optical image stabilizer (OIS) processor in the digital camera according to the first embodiment.
Figure 5:
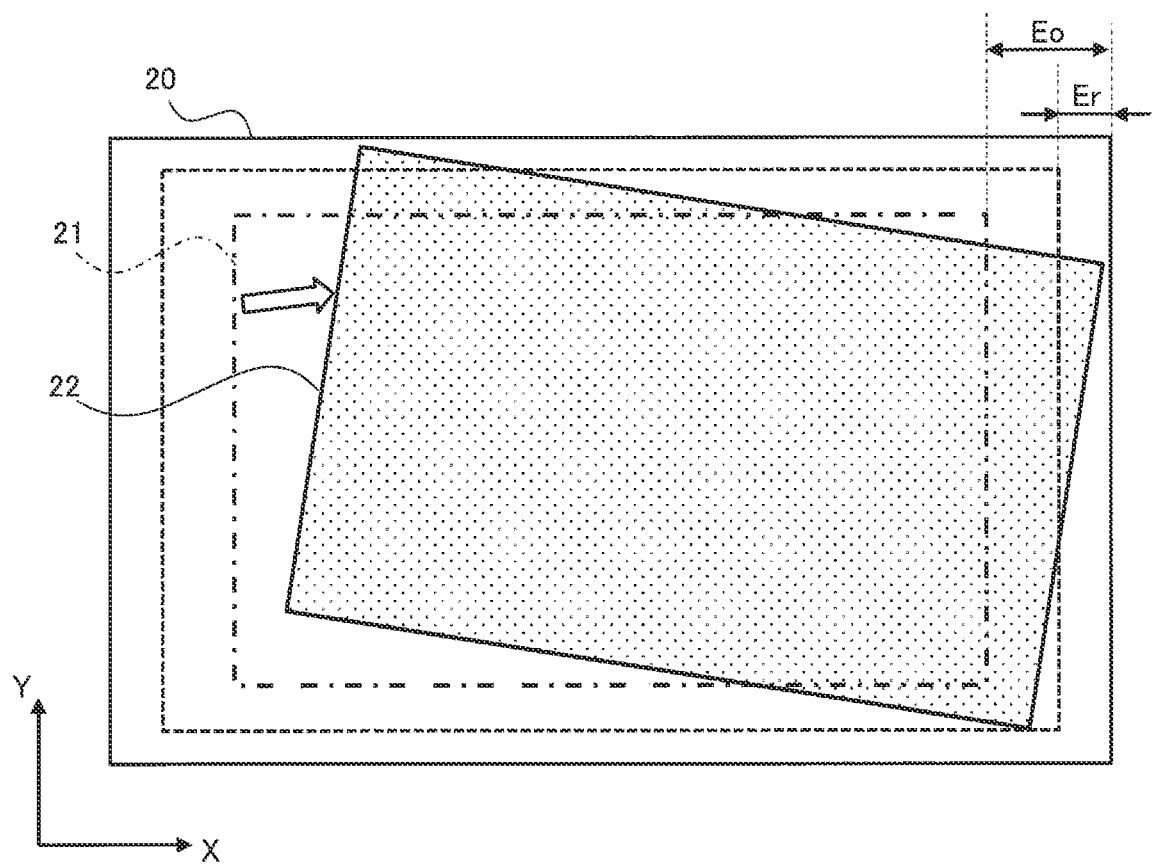
FIG. 5 is a view for explaining an electronic image stabilizer (EIS) processor in the digital camera according to the first embodiment.

Referring to FIGS. 3 to 5, a description will be given on the configuration of t e digital camera 1 according to the present embodiment for achieving various image stabilizing functions.

FIG. 3 is a block diagram showing the configuration of the IBIS processor 183 in the digital camera 1 of the present embodiment. FIG. 4 is a block diagram showing the configuration of the OIS processor 223 in the digital camera 1.

The digital camera 1 of the present embodiment is configured to be capable of analyzing vibrations proper to various gimbal devices 5. For example, as shown in FIG. 3, the digital camera 1 of the present embodiment includes a vibration analyzer 147 and a filter adjuster 140 as the functional configuration of the camera controller 140. The digital camera 1 of the present embodiment also includes the EIS processor 143 implementing the EIS function as the functional configuration of the camera controller 140.

1-4-1. OIS Processor

Referring to FIG. 4, the configuration of the OIS processor 223 in the interchangeable lens 200 will be described. The OIS processor 223 includes a high pass filter (HPF) 306, a phase compensator 307, an integrator 308, and a PID controller 310.

The HPF 306 blocks a predetermined low-frequency component included in a signal received from the gyro sensor 224 in order to block a drift component, for example.

The phase compensator 307 corrects, for a signal received from the HPF 306, a phase delay caused by the OIS driver 221 or the like.

The integrator 308 integrates a signal indicating the angular velocity of the shake (vibration) input from the phase compensator 307 to generate a shake detection signal indicating the angle of the shake (vibration). The shake detection signal from the integrator 308 is input to the PID controller 310. Here, the OIS processor 223 may use or add a filter configuration other than the above configuration, such as a notch filter for noise processing.

The PID controller 310 performs PID control on the basis of the difference between the shake detection signal from the integrator 308 and the current position information of the OIS lens 220 received from the position sensor 222, and generates a drive signal for the OIS driver 221. The OIS driver 221 drives the OIS lens 220 on the basis of the drive signal.

1-4-2. IBIS Processor

The configuration of the IBIS processor 183 in the camera body 100 will be described with reference to FIG. 3. The IBIS processor 183 includes a variable filter 406, a phase compensator 407, an integrator 408, and a PID controller 410, for example. For example, the IBIS processor 183 further includes an integrator 408A that does not pass through the variable filter 406.

The variable filter 406 is a filter having variable filter characteristics and includes a band-pass filter or a high-order filter, for example. For example, the variable filter 406 is set to block a predetermined low-frequency component included in a signal received from the gyro sensor 184 in order to block a drift component in the variable filter 406, a cutoff frequency may be set to block a low-frequency band (e.g., 0.1 to 1 Hz), such as a frequency at which the user performs panning during image shooting, in the initial state, for example. The integrator 408A outputs a shake amount in a state not filtered by the variable filter 406 to the vibration analyzer 147.

The phase compensator 407 corrects a phase delay caused by the sensor driver 181 or the like with respect to the signal received from the variable filter 406.

The integrator 408 integrates the signal indicating the angular velocity of the shake (vibration) input from the phase compensator 407 to generate a signal indicating the angle of the shake (vibration) (hereinafter referred to as a "shake detection signal"). The shake detection signal from the integrator 408 is input to the PID controller 410. Here, the IBIS processor 183 may use or add a filter configuration other than the above configuration, such as a notch filter for noise processing.

On the basis of the output from the position sensor 182 and the output from the integrator 408, the PID controller 410 generates a drive signal for shifting the image sensor 110 and outputs the generated signal to the sensor driver 181. The sensor driver 181 drives the image sensor 110 on the basis of the drive signal.

In the camera controller 140, the vibration analyzer 147 performs vibration analysis such as frequency analysis on the shake amount from the integrator 408A. For example, the vibration analyzer 147 performs various calculations such as fast Fourier transform (FFT) to determine whether the frequency spectrum of the shake amount includes features such as a predetermined frequency component. The filter adjuster 148 controls the filter characteristics of the variable filter 406 on the basis of the analysis result by the vibration analyzer 147.

1-4-3. EIS Processor

The EIS processor 143 will be described with reference to FIG. 5. FIG. 5 is a view for explaining the EIS function in the digital camera 1.

As exemplified in FIG. 5, the EIS processor 143 of the present embodiment performs processing to crop an image in a narrowed area by a preset cropping amount Eo from the entire image in an image data 20 generated by the image sensor 110. For example, various image processing for recording the image shooting result is performed on the cropped image data. For example, electronic zoom processing may be performed so that the cropped image has the same size as the image before the cropping.

The EIS processor 143 calculates a shake correction amount on the basis of the input shake detection signal and adjusts the position at which the image is cropped by the calculated shake correction amount, thereby achieving the EIS function. For example, a reference area 21 is set, where the cropped image is located when the shake correction amount in the EIS processor 143 is zero, with the center position of the entire image in the image data 20 as reference is set. The reference area 21 is set along the horizontal direction X and the vertical direction Y of the image data 20.

The EIS processor 143 translates an image area 22 to be cropped in the horizontal direction X from the reference area 21 in accordance with the shake correction amount in the yaw direction, for example. Similarly, the EIS processor 143 translates the image area 22 in the vertical direction Y in accordance with the shake correction amount in the pitch direction. The EIS processor 143 rotates the direction of the image area 22 on the XY plane from the direction of the reference area 21 in accordance with the shake correction amount in the roll direction.

The position adjustment of the image area 22 as described above, that is, the EIS function, can be performed within the range of the cropping amount Eo. Specifically, the image area 22 is translated within the range of the cropping amount Eo excluding the amount for the roll as a margin Er. The image area 22 is rotated within the range of the rotation angle which is within the margin Er for the roll at the cropping amount Eo. The margin Er for the roll is determined in accordance with the lens state of the interchangeable lens 200, for example.

The configuration of the digital camera 1 of the present embodiment as described above is an example and is not particularly limited thereto. For example, additionally or alternately to the camera controller 140 as described above, the lens controller 240 may be configured to be capable of analyzing vibrations proper to the gimbal device 5. Additionally or alternately to the configuration of the IBIS processor 183 as described above, the configuration of the HPF 306 and the like of the OIS processor 223 may be changed in the same manner as the variable filter 406 of the IBIS processor 183. The digital camera 1 of the present embodiment may not necessarily have three types of image stabilizing functions but may have any one type of image stabilizing function, for example. Hereinafter, as an example, an operation example in a case where the OIS function is not used will be described.

2. Operation

The image stabilizing operation of the digital camera 1 configured as described above will be described below. In the present embodiment, an example of the operation of the digital camera 1 for addressing the vibration proper to the gimbal device 5 in the imaging system 10 will be described.

Figure 6:
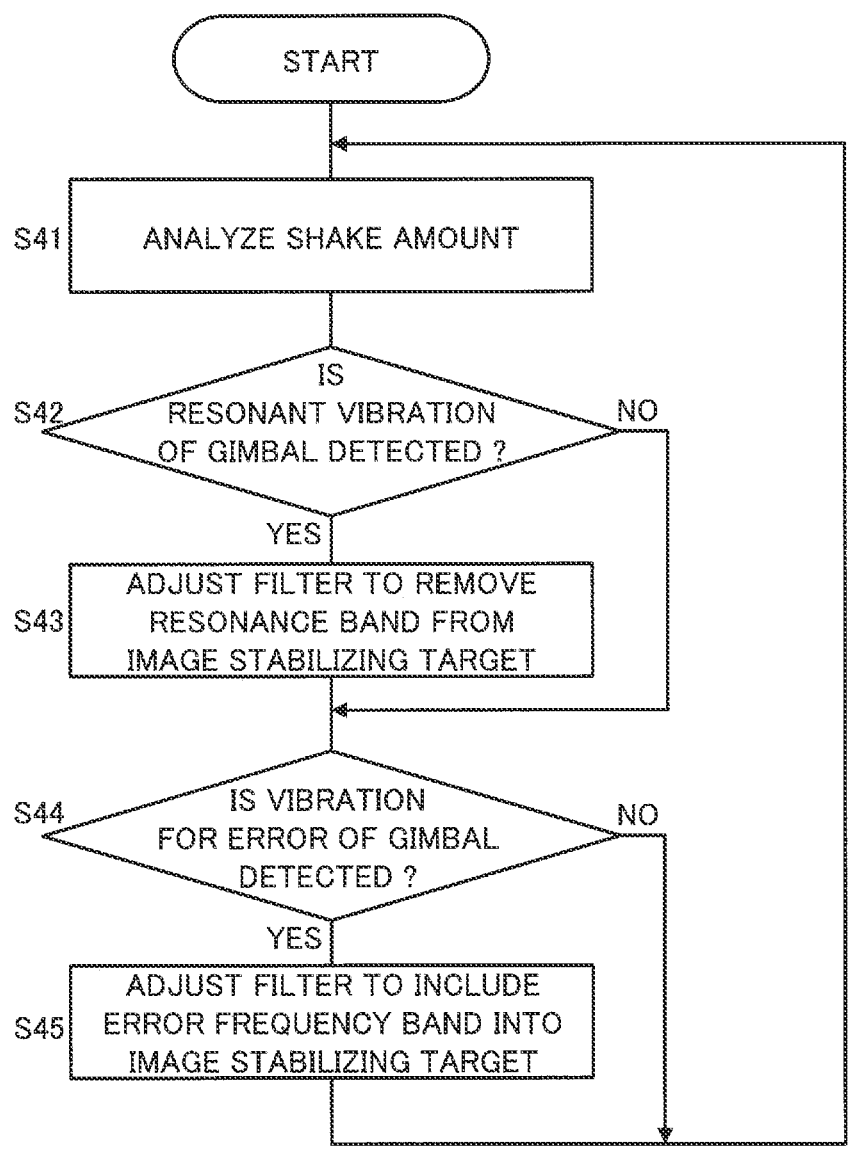
FIG. 6 is a flowchart illustrating an operation of the digital camera according to the first embodiment.

FIG. 6 is a flowchart illustrating the operation of the digital camera 1 according to the first embodiment. For example, each of the processing shown in the flowchart is performed by the camera controller 140 when the image stabilizing operations of the digital camera 1 and the gimbal device are executed in parallel.

In the flowchart of FIG. 6, the camera controller 140 of the digital camera 1, functioning as the vibration analyzer 147, analyzes the shake amount output from the integrator 408A without passing through the variable filter 406 (S41). For example, the vibration analyzer 147 performs frequency analysis by FFT or the like. Note that the analysis target of the vibration analyzer 147 is not limited to the output from the integrator 408A but may be a signal directly from the gyro sensor 184 or a signal from another place.

Next, the camera controller 140 detects whether there exists a vibration included in a resonance band for the gimbal device 5, on the basis of the frequency of the analysis result (S42). The resonance band is a frequency band in the vicinity of a frequency regarded as the resonance frequency of the gimbal device 5 (e.g., a part of the frequency band in the range of 200 Hz to 1 KHz). The information on the resonance band may be stored into flash memory 142 for each type to be mounted in advance, or may be received by data communication, for example.

The vibration due to the resonance of the gimbal device 5 is a mechanical vibration irrelevant to the image stabilization. If the vibration is detected by the gyro sensor 184 and input to the PID controller 410 or the like as an image stabilization target, an erroneous operation of the image stabilizing function would be caused. To address this, in response to detection of the vibration of t resonance band of the gimbal device 5 (YES in S42), the camera controller 140, functioning as the filter adjuster 148, controls the filer characteristics of the variable filter 406 so that a variable filter 406A blocks the resonance band, for example (S43).

On the other hand, when the vibration of resonance band of the gimbal device 5 is not detected (NO in S42), the camera controller 140 does not perform the process of step S43 in particular and proceeds to step S44, for example.

On the basis of the analysis result of the shake amount (S41), The camera controller 140 detects whether there exists a vibration corresponding to the erroneous operation of the gimbal device 5 (S44). For example, the vibration is a vibration predetermined in consideration to be caused when the gimbal device 5 operates to erroneously correct the panning shooting of the user, due to the natural vibration of the gimbal device 5. For example, the predetermined vibration is found with analysis using the characteristics of one or more frequency components.

In case where the erroneous operation of the gimbal device 5 as described above occurs, the re-correction using the image stabilizing function of the digital camera 1 is considered to be helpful. Therefore, in response to detection of the vibration due to the erroneous operation of the gimbal device 5 (YES in S44), the camera controller 140, functioning as the filter adjuster 148, controls the filter characteristics so that the variable filter 406 can interpolate the vibration of the band corresponding to the erroneous operation, for example (S45). For example, the filter adjuster 148 controls the variable filter 406 to lower the cutoff frequency of the low-frequency band described above in step S45.

Thereafter, the camera controller 140 again performs the processing from step S41 at a predetermined cycle, for example.

When the vibration caused by the erroneous operation of the gimbal device 5 is not detected (NO in S44), the camera controller 140 does not perform the processing of step S45 in particular and returns to step S41, for example.

The camera controller 140 repeatedly performs the above processing when the image stabilizing operation is in execution, for example.

According to the above processing, when the vibration proper to the gimbal device 5 is detected (YES in S42 and S44), the variable filter 406 is controlled (S43 and S45), and both the IBIS function and the EIS function can be appropriately operated on the vibration proper to the gimbal device 5. When the specific vibration as described above is not detected (NO in S42 and S44), the IBIS function and the like are operated without performing the filter adjustment in steps S43 and S45. Thus, the image stabilizing operation can be performed accurately with excessive control being avoided. As described above, by controlling the filter adjustment adequately for using an external device such as the gimbal device 5, the digital camera 1 of the present embodiment is possible to ensure the image stabilizing accuracy with suppressing the erroneous operation due to the external device.

Note that the operation described above is not limited to both the IBIS function and the EIS function but may be applied to either the IBIS function or the EIS function or may be applied to the OIS function. The processing described above is not limited to the camera controller 140, but a part or all of the processing may be performed by the lens controller 240.

3. Summary

As described above, in the imaging system 10 according to the first embodiment, the digital camera 1 and the camera body 100 are each an example of the imaging apparatus mountable on the external device such as the gimbal device 5. The digital camera 1 and the camera body 100 include the image sensor 110 as an example of the image sensor, the respective processors 143, 183, 223 and the respective drivers 181, 221 each as an example of the image stabilizer, and the respective controllers 140, 240 each as an example of the controller. The image sensor 110 generates image data by capturing a subject image formed through the interchangeable lens 200 as an example of the optical system. The respective processors 143, 183, 223 perform image stabilization on the image indicated by the image data. The respective controllers 140, 240 detect the vibration caused by the resonance frequency of the external device, and control the image stabilizer to remove the vibration caused by the resonance frequency from the image stabilization target on the basis of the detection result. This can suppress the erroneous operation in image stabilization due to the external device of the imaging apparatus.

For example, the external device includes a gimbal device 5 to which the imaging apparatus is attachable and that performs image stabilization by controlling the direction of the imaging apparatus. In response to detection of the vibration caused by the resonance frequency of the gimbal device, the controller of the imaging apparatus controls the image stabilizer to remove the vibration caused by the resonance frequency from the image stabilization target.

The digital camera 1 of the present embodiment includes, for example, the camera controller 140 as the controller for controlling at least one of the image stabilizers to detect a specific motion of the gimbal device 5 for moving the digital camera 1, and reduce the effect of the specific motion in the image stabilization on the basis of the detection result. This can suppress a situation where the image quality for shooting by using the gimbal device 5 deteriorates due to the vibration proper to the gimbal device 5.

In the present embodiment, for example, when the vibration caused by the resonance frequency of the gimbal device 5 is detected (YES in S42), the camera controller 140 controls at least one of two or more image stabilizers so as to remove the vibration caused by the resonance frequency from the image stabilization target (343). It is thereby possible to avoid a situation where the resonance of the gimbal device 5 causes an erroneous operation in the image stabilization of the digital camera 1, and to improve the image shooting quality for using the gimbal device 5.

In the present embodiment, for example, when a specific movement by the gimbal device 5 is detected (YES in S44), the camera controller 140 controls at least one of the two or more image stabilizers so as to include a vibration of the specific movement into the image stabilization target (S45). Thereby, the image stabilizer of the digital camera 1 corrects the effect of the erroneous operation of the gimbal device 5, and the image shooting quality for using the gimbal device can be improved.

In the present embodiment, the image stabilizer includes at least one of a first image stabilizer (OIS processor 223 and OIS driver 221) that performs image stabilization by moving a correction lens included in the optical system within a lens movable range in a plane perpendicular to an optical axis of the optical system, a second image stabilizer (IBIS processor 183 and sensor driver 181) that performs image stabilization by moving the image sensor within a sensor movable range in the plane perpendicular to the optical axis; and a third image stabilizer (EIS processor 143) that performs image stabilization by adjusting an area from which an image indicated by the image data is to be cropped within a range of a preset cropping amount.

Further, in the present embodiment, the controller of the imaging apparatus detects the vibration caused by the external device and controls whether to remove the detected vibration from the image stabilization target in the image stabilizer in accordance with the detection result (S41 to S43). The imaging system of the present embodiment includes the imaging apparatus and an external device on which the imaging apparatus is mountable. The imaging apparatus and the imaging system of the present disclosure can also suppress an erroneous operation in image stabilization due to the external device of the imaging apparatus.

Second Embodiment

A second embodiment of the present disclosure will be described with reference to FIGS. 7 to 10. In the first embodiment, the imaging system 10 including the gimbal device as an example of the external device is described, but the external device is not limited to the gimbal device. In the second embodiment, an imaging system 10A as an example in which the external device is a movable body will be described.

The digital camera 1 and the imaging system 10A according to the present embodiment will be described below by omitting descriptions of configurations and operations similar to those of the digital camera 1 and the imaging system 10 according to the first embodiment.

Figure 7:
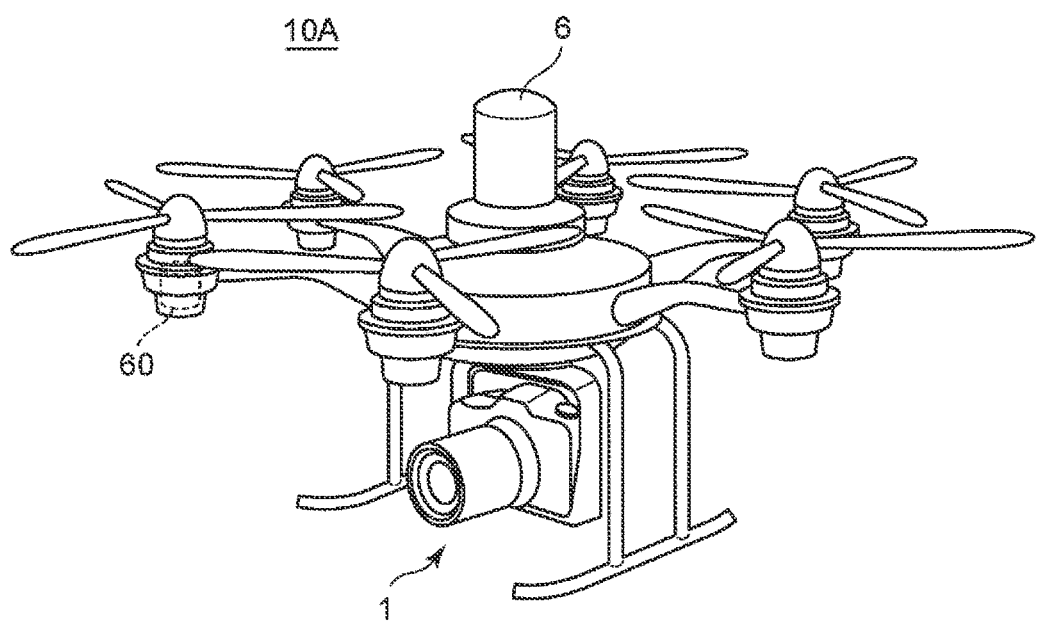
FIG. 7 is an external view illustrating an imaging system according to a second embodiment.

FIG. 7 is an external view illustrating an example of the imaging system 10A according to the second embodiment. The imaging system 10A of the present embodiment includes the digital camera 1 similar to that of the first embodiment and a drone 6 to which the digital camera 1 is attached. In the present embodiment, the digital camera 1 is directly mounted on the drone 6 without using a gimbal device in particular. For the mounting the digital camera 1, a support member such as a camera rig can be used appropriately.

The drone 6 is an example of a movable body and an external device formed of a movable body. The drone 6 includes a driving source 60 such a motor. The driving source 60 generates power for moving the drone 6. The drone 6 has a natural frequency due to the vibration of the driving source 60, for example. The drive frequency driven by the driving source 60 may be variable.

In the imaging system 10A of the present embodiment, in response to detection of a vibration of an external device such as the drone 6, the digital camera 1 controls whether to remove the vibration from an image stabilization target in accordance with the frequency of the detected vibration. The operation of the digital camera 1 of the present embodiment will be described below.

Figure 8:
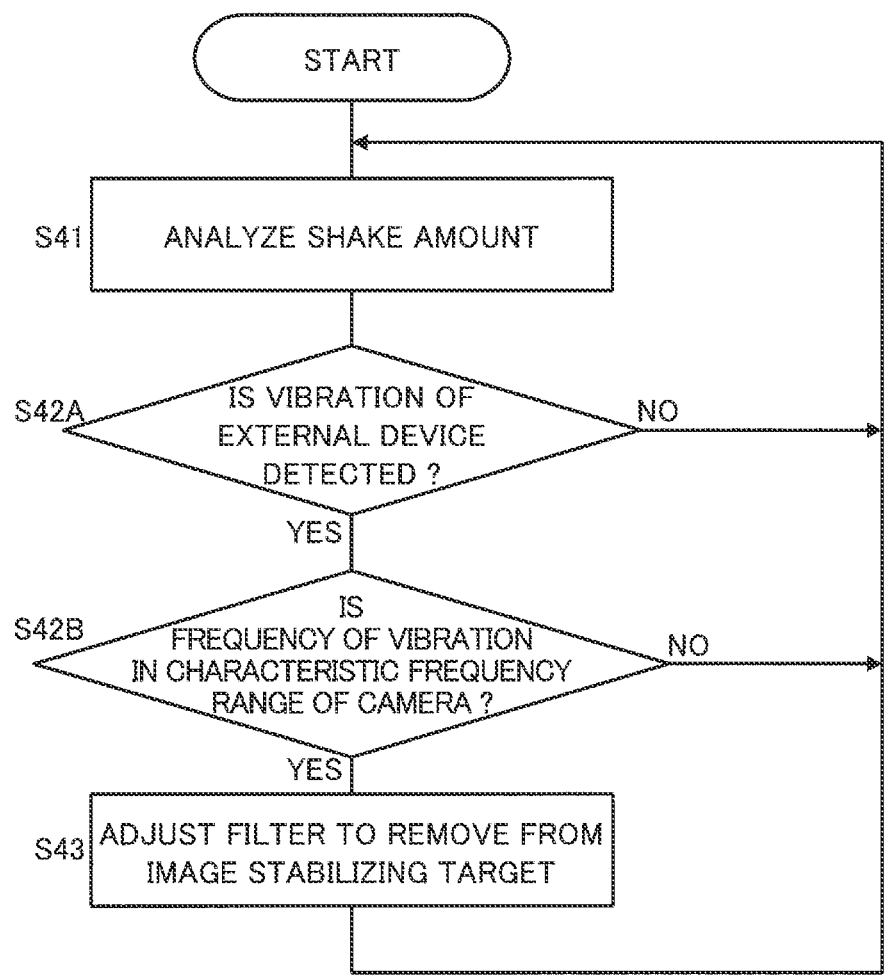
FIG. 8 is a flowchart illustrating an operation of a digital camera according to the second embodiment.

FIG. 8 is a flowchart illustrating the operation of the digital camera 1 according to the second embodiment. In the present embodiment, the controller 140 of the digital camera 1 analyzes the shake amount as the vibration analyzer 147 as in the first embodiment (S41), and detects whether the vibration of the external device such as the drone 6 occurs on the basis of the frequency of the analysis result of the shake amount (S42A).

When the vibration of the external device is detected (YES in S42A), the camera controller 140 of the present embodiment determines whether the frequency of the detected vibration is included within a predetermined characteristic frequency range (S42B). For example, the characteristic frequency range is an area of frequencies in which an input of an excessive vibration is presumed to cause an erroneous operation of the image stabilizing function, in accordance with frequency characteristics in the internal constituents of the digital camera 1, such as the gyro sensor 184 and the sensor driver 181 in the IBIS function. For example, the characteristic frequency range is set in advance and stored into the flash memory 142 or the like. Details of the characteristic frequency range will be described later (see FIGS. 9 and 10).

In the present embodiment, when determining that the frequency of the detected vibration is included in the characteristic frequency range (YES in S42B), the camera controller 140 performs control to remove the characteristic frequency range in the vicinity of the frequency of the detected vibration from the image stabilization target (S43). It is thereby possible to avoid a situation where the vibration of the external device such as the drone 6 causes an erroneous operation of the image stabilizing function. The processing of step S43 can be performed by controlling the variable filter 406 as in the first embodiment, for example.

On the other hand, when the frequency of the detected vibration is not included in the characteristic frequency range (NO in S42B), the camera controller 140 returns to step S41 without performing the processing of step 343. Thus, even when the vibration of the drone 6 has occurred, in a case where the vibration is expected not to cause the erroneous operation of the image stabilizing function, it is possible to perform image stabilization with high accuracy without applying an unnecessary filtering, for example.

The frequency characteristics in the digital camera 1 as described above will be described with reference to FIGS. 9 and 10.

Figure 9:
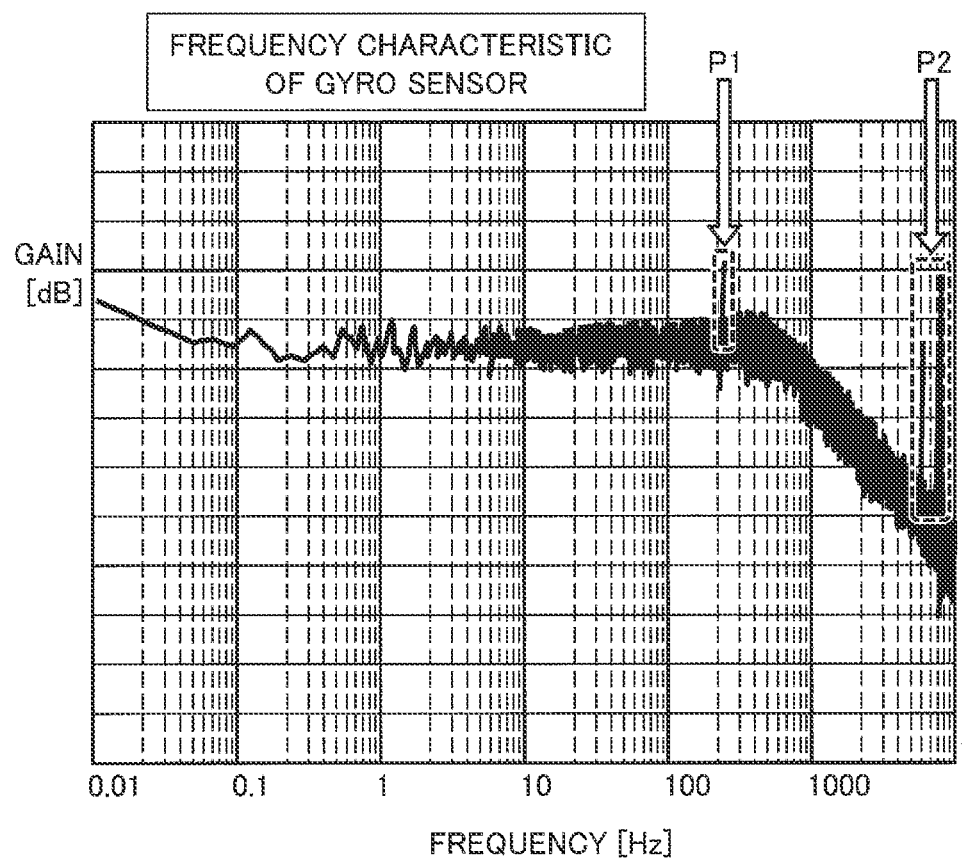
FIG. 9 is a graph illustrating a frequency characteristic of a gyro sensor in a digital camera.
Figure 10:
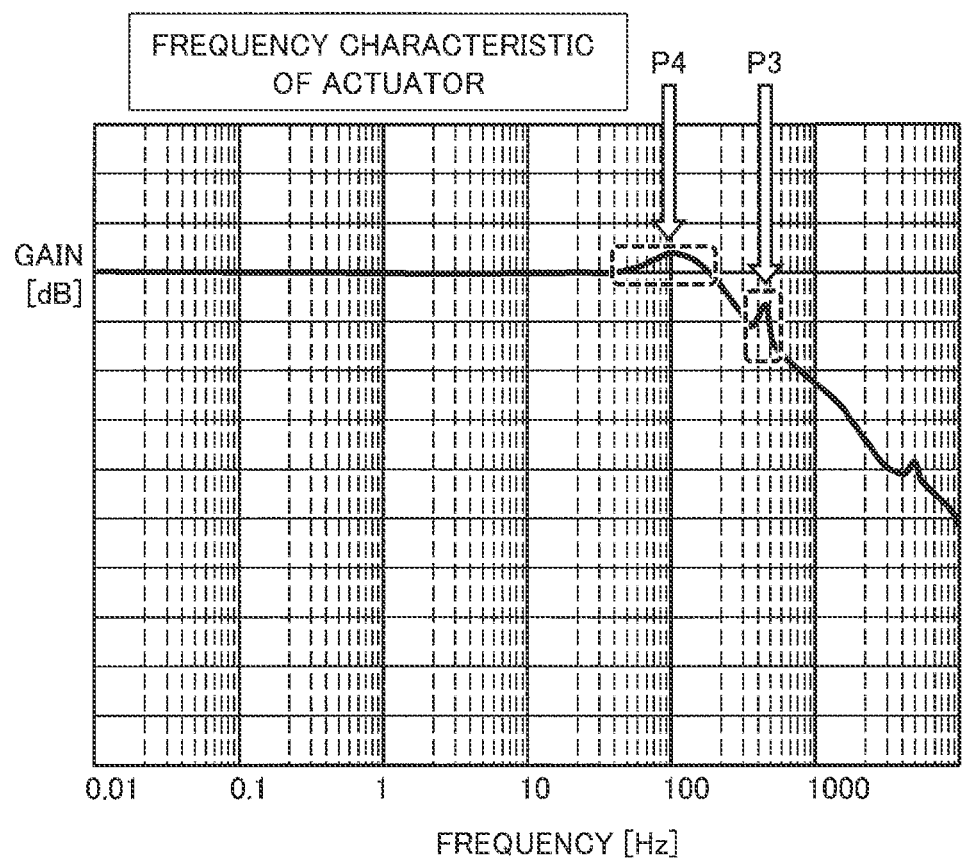
FIG. 10 is a graph illustrating a frequency characteristic of an actuator in the digital camera.

FIG. 9 is a graph illustrating the frequency characteristic of the gyro sensor 184 in the digital camera 1. FIG. 10 is a graph illustrating the frequency characteristic of the actuator such as the sensor driver 181. In FIGS. 9 and 10, the horizontal axis represents the frequency, and the vertical axis represents a gain.

The graph of the frequency characteristic illustrated in FIG. 9 includes a peak P1 at the resonance frequency of the gyro sensor 184 and a peak P2 at the offset frequency thereof. The graph of frequency characteristic illustrated in FIG. 10 includes peaks P3 and P4 such as the rise of a gain for the control of the actuator system e.g. the sensor driver 181 or the neighborhood of the frequency of the mechanical resonance of the actuator system. The digital camera 1 of the present embodiment has one or more characteristic frequency ranges so as to include the frequencies of one or more peaks P1 to P4 in the frequency characteristic as described above, for example.

For example, when the natural frequency at which the drone 6 vibrates coincides with the offset or resonance frequency such as the peaks P1 and P2 shown in FIG. 9, amplifying the signal in this frequency band by the gyro sensor 184 would cause erroneous control in the image stabilizing operation. When the natural frequency at which the drone 6 vibrates coincides with the mechanical resonance frequencies such as the peaks P3 and P4 shown in FIG. 10, a situation is concerned where the mechanism such as the sensor driver 181 would cause erroneous control or oscillation due to the amplification of the vibration in this frequency band. The natural frequency of the drone 6 varies depending on the individual, for example.

To address this when the drone 6 vibrates in a frequency band such as the peaks P1 to P4, the digital camera 1 of the present embodiment detects the vibration by calculation based on an output from the gyro sensor 184 (YES in S42A and S42B), and performs the control for filtering the frequency band of the vibration (S43). Thus, even when a slight effect is exerted on the original control of the image stabilizing operation, it is possible to suppress the erroneous operation for image stabilization, which would be excessive due to the amplification as described above.

Meanwhile, the digital camera 1 of the present embodiment does not apply unnecessary filtering to the image stabilizing function when a normal state such as when the vibration is not detected (NO in S42A) or even when the vibration caused by the drone 6 is detected but is not in a specific frequency band (NO in S42B). This can optimize the performance of the image stabilizing function when the external device such as the drone 6 is used. For example, a case may be expected where the mechanical resonance based on the level of each of the peaks P3 and P4 in FIG. 10 has no problem in the normal state, so that its effect on the image stabilizing operation can be neglected. In such a case, the digital camera 1 of the present embodiment can avoid a deterioration in the performance of the image stabilizing function due to unnecessary filtering.

As described above, in the imaging system 10A of the present embodiment, the controller detects the vibration caused by the resonance frequency of the external device such as the drone 6 (S41, S42A). When the resonance frequency of the detected vibration is a predetermined frequency, the controller controls the image stabilizer so as to remove the vibration caused by the resonance frequency from the image stabilization target (YES in S42B, S43). When the resonance frequency of the detected vibration is not the predetermined frequency, the controller does not perform the control for removing the vibration caused by the resonance frequency from the image stabilization target (NO in S42B). Thus, when the vibration of the external device is detected, the control for removing the detected vibration from the image stabilization target is applied as necessary. As a result, when the external device is used, it is possible to avoid a situation where the accuracy of the external device excessively deteriorates with suppressing an erroneous operation in image stabilization.

The imaging apparatus of the present embodiment further includes the gyro sensors 184, 224 each as an example of a shake detector for detecting an amount of shake of the imaging apparatus. The predetermined frequency includes at least one of a resonance frequency and an offset frequency of the shake detector and a resonance frequency of the image stabilizer (the various drivers 181, 221, and the like). When a vibration of such a frequency is detected, the control for removing the vibration from the image stabilization target is applied, whereby it is possible to improve both the suppression the erroneous operation in image stabilization and avoidance of a decrease in accuracy when an external device is used.

In the present embodiment, the vibration of the external device such as the drone 6 may not necessarily be resonance. Even when detecting such a vibration caused by the external device, the controller may control whether to remove the detected vibration from the image stabilization target in the image stabilizer in accordance with the detection result of the vibration different from the camera shake vibration that should be corrected originally.

Other Embodiments

As the above, the first and second embodiments have been described as examples of the techniques disclosed in the present application. However, the techniques in the present disclosure are not limited thereto but can also be applied to embodiments in which modifications, substitutions, additions, or omissions are made as appropriate. Further, each of the constituents described in the first and second embodiments can be combined to form a new embodiment. Other embodiments will be described below.

In the second embodiment described above, the imaging system 10A in which the digital camera 1 is directly attached to an external device such as the drone 6 has been described. In the present embodiment, the digital camera 1 may be indirectly attached to the external device. This present modification will be described with reference to FIG. 11.

Figure 11:
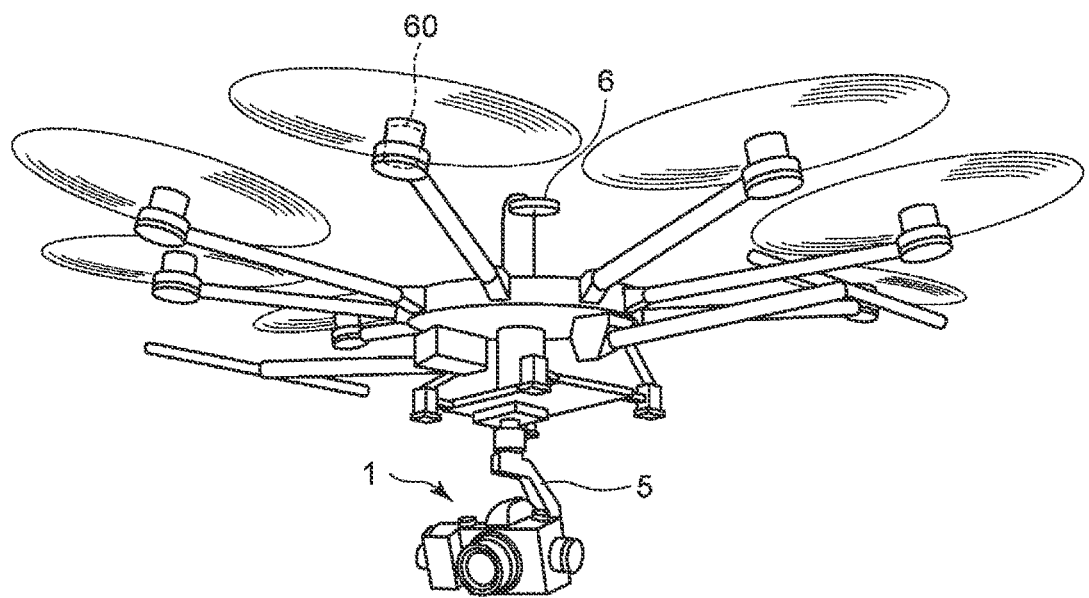
FIG. 11 is an external view showing a modification of the imaging system according to the second embodiment.

FIG. 11 is an external view illustrating an imaging system 10B according to the modification of the second embodiment. In the present modification, the imaging system 10B further includes a gimbal device 5 in addition to the digital camera 1 and the drone 6 included in the imaging system 10A of the second embodiment. As in the present modification, the digital camera 1 may be mounted on the gimbal device 5, and the gimbal device 5 may be attached to the drone 6. That is, the digital camera 1 may be attached to the drone 6 via the gimbal device 5 in such a case, by operating as in each of the first and second embodiments described above, the digital camera 1 can suppress erroneous operations due to the vibrations of the external devices such as the gimbal device 5 and the drone 6 to perform the image stabilizing operation.

In the above embodiments, the gimbal device 5 or the drone 6 has been exemplified as an example of the external device; however, the external device of the present embodiment is not limited thereto in the present embodiment, the external device may be a movable body other than the drone 6 and may be any one of various vehicles such as an automobile or a motorcycle. The external device of the present embodiment may be any one of various mechanical devices to which the imaging apparatus can be attached directly or indirectly.

In the above embodiments, the lens-interchangeable digital camera has been described as an example of the imaging apparatus; however, the imaging apparatus of the present embodiment may be a digital camera that is not particularly a lens-interchangeable type. The idea of the present disclosure may not only be a digital camera but also be a movie camera and can also be applied to electronic device having various image shooting functions such as a portable telephone with a camera, a smartphone, or a personal computer (PC).

As described above, the embodiments have been described as examples of the techniques in the present disclosure. To that end, the accompanying drawings and detailed description thereof have been provided.

Therefore, the constituents described in the accompanying drawings and the detailed description may include not only constituents essential for achieving an object of the present disclosure but also constituents not essential for achieving it, for the purpose of exemplifying the above techniques. Thus, those non-essential constituents should not be immediately recognized as essential by the fact that those non-essential constituents are described in the accompanying drawings or in the detailed description.

With the above embodiments being intended to illustrate the techniques in the present disclosure, various modifications, substitutions, additions, omissions, and the like can be made within the scope of the claims or the equivalents thereto.

The concept of the present disclosure can be applied to an electronic device (imaging apparatuses such as digital cameras, camcorders, mobile phones, smartphones, and the like) having an image shooting function provided with an image stabilizing function.

The invention claimed is:

1. An imaging apparatus mountable on an external device, the imaging apparatus comprising:
    an image sensor that captures a subject image formed through an optical system to generate image data;
    an image stabilizer that performs image stabilization on an image indicated by the image data; and
    a controller that detects a vibration of a resonance frequency particular to the external device, wherein based on a detection result, the controller controls the image stabilizer to exclude, from an image stabilization target, the vibration of the resonance frequency, the image stabilization target being a target to be corrected by the image stabilization.

2. The imaging apparatus according to claim 1, wherein when the controller detects the vibration of the resonance frequency of the external device,
    in a case where the resonance frequency of the detected vibration is a predetermined frequency, the controller controls the image stabilizer to exclude the vibration of the resonance frequency from the image stabilization target, and
    in a case where the resonance frequency of the detected vibration is not the predetermined frequency, the controller performs no control for excluding the vibration of the resonance frequency from the image stabilization target.

3. The imaging apparatus according to claim 2, further comprising a shake detector that detects an amount of shake of the image apparatus,
    wherein the predetermined frequency includes at least one of a resonance frequency of the shake detector, an offset frequency of the shake detector, and a resonance frequency of the image stabilizer.

4. The imaging apparatus according to claim 1, wherein the external device includes a gimbal device to which the imaging apparatus is attachable, the gimbal device performing image stabilization by controlling a direction of the imaging apparatus, and
    in response to detection of the vibration of the resonance frequency of the gimbal device, the controller controls the image stabilizer to exclude the vibration of the resonance frequency from the image stabilization target.

5. The imaging apparatus according to claim 4, wherein, in response to detection of a specific movement by the gimbal device, the controller controls the image stabilizer to include a vibration of the specific movement into the image stabilization target.

6. The imaging apparatus according to claim 1, wherein the image stabilizer includes at least one of
    a first image stabilizer that performs image stabilization by moving a correction lens included in the optical system within a lens movable range in a plane perpendicular to an optical axis of the optical system,
    a second image stabilizer that performs image stabilization by moving the image sensor within a sensor movable range in the plane perpendicular to the optical axis, and
    a third image stabilizer that performs image stabilization by adjusting an area from which an image indicated by the image data is cropped, within a range of a preset cropping amount.

7. The imaging apparatus according to claim 1, wherein the image stabilizer includes a variable filter, and when the controller detects the vibration of the resonance frequency particular to the external device, the controller controls the variable filter to exclude the vibration of the resonance frequency particular to the external device from the image stabilization target.

8. The imaging apparatus according to claim 7, wherein in a case where the controller does not detect the vibration of the resonance frequency particular to the external device, the controller controls the variable filter so as not to exclude the vibration of the resonance frequency particular to the external device from the image stabilization target.

9. An imaging system comprising:
    an imaging apparatus; and
    an external device on which the imaging apparatus is mountable,
    wherein the imaging apparatus comprises:
        an image sensor that captures a subject image formed through an optical system to generate image data;
        an image stabilizer that performs image stabilization on an image indicated by the image data; and a controller that detects a vibration of a resonance frequency particular to the external device, wherein based on a detection result, the controller controls the image stabilizer to exclude, from an image stabilization target, the vibration of the resonance frequency, the image stabilization target being a target to be corrected by the image stabilization.

10. The imaging system according to claim 9, wherein the external device includes at least one of a gimbal device, a drone, and a vehicle.

11. The imaging apparatus according to claim 9, wherein the image stabilizer includes a variable filter, and when the controller detects the vibration of the resonance frequency of external device, the controller controls the variable filter to exclude the vibration of the resonance frequency of the external device from the image stabilization target.

12. The imaging apparatus according to claim 11, wherein in a case where the controller does not detect the vibration of the resonance frequency of the external device, the controller controls the variable filter so as not to exclude the vibration of the resonance frequency of the external device from the image stabilization target.

13. An imaging apparatus mountable on an external device, the imaging apparatus comprising:

an image sensor that captures a subject image formed through an optical system to generate image data;
an image stabilizer that performs image stabilization on an image indicated by the image data; and
a controller that controls the image stabilizer,
wherein the controller
detects a vibration particular to the external device, and
controls whether to exclude, from an image stabilization target, the detected vibration in the image stabilizer, in accordance with a detection result, the image stabilization target being a target to be corrected by the image stabilization.

14. The imaging apparatus according to claim 13, wherein the image stabilizer includes a variable filter, and when the controller detects the vibration particular to the external device, the controller controls the variable filter to exclude the vibration particular to the external device from the image stabilization target.

15. The imaging apparatus according to claim 14, wherein in a case where the controller does not detect the vibration particular to the external device, the controller controls the variable filter so as not to exclude the vibration particular to the external device from the image stabilization target.

* * * * *